ELECTRIC PULSE SIGNALING SYSTEM

Filed Feb. 3, 1949

INVENTORS
Leslie Ivan Farren
Norman Edwin Head
Maurice Moise Levy
By [signature]
ATTORNEY Patented Dec. 15, 1953 2,662,979

UNITED STATES PATENT OFFICE 2,662,979

ELECTRIC PULSE SIGNALING SYSTEM

Leslie Ivan Farren and Norman Edwin Head, Sudbury, Wembley, and Maurice Moïse Levy, Earls Court, England, assignors to The General Electric Company, Limited, London, England Application February 3, 1949, Serial No. 74,395

Claims priority, application Great Britain February 4, 1948

8 Claims. (Cl. 250—27)

The present invention relates to pulse signalling systems in which time-modulated pulses are employed. In time-modulation the instants of occurrence of pulses of a train are varied in accordance with signals to be transmitted. The mean instant of occurrence of the pulses is usually regularly recurrent.

The invention is concerned with the demodulation of such pulses and it is known that since the pulses contain no component, or only a component of very small magnitude, at the modulation frequencies, they cannot be demodulated merely by passing them through a low-pass filter. The usual procedure is, therefore, to convert the time-modulated pulses into width-modulated pulses and then to demodulate the latter pulses by passing them through a low-pass filter, since width-modulated pulses contain a substantial component at the modulation frequencies.

In multi-channel systems, each channel is provided by a train of time-modulated pulses and the trains of different channels are interlaced with one another, the pulses of all the trains being of the same recurrence frequency. Each channel is, therefore, allotted a recurrent series of time intervals each of width sufficient to accommodate a pulse at the two limits of its displacement in time due to modulation.

In order to avoid cross-talk between adjacent channels, it is necessary to ensure that no appreciable pulse energy of one channel should be present during the time interval which has been allocated to another channel. On the other hand, it is clearly desirable that the channels should be spaced as closely as possible together in time consistent with the avoidance of cross-talk, in order that the best use may be made of the total signalling time. One factor by which the two requirements of absence of cross-talk and closeness of adjacent channels can be satisfied is by increase in the steepness of the leading and trailing edges of the pulses. Further advantages can be obtained by the careful choice of the method used in converting the time-modulated pulses into width-modulated pulses.

Similar considerations apply also in single-channel signalling systems because in this case also it is necessary that the excursion of a pulse due to its time-modulation should not cause energy associated with that pulse to occur at the same time as is allotted to the next pulse of the same channel. It is, further, advantageous that the time excursions allotted to the pulses should occupy as great as possible a fraction of the total time.

The present invention has for its object to provide improved means for converting time-modulated pulses into width-modulated pulses in which the two requirements above referred to can be more nearly met than in existing systems.

According to the present invention apparatus for demodulating time-modulated pulses comprises a cathode ray tube, means for deflecting the cathode ray beam recurrently over an apertured member, or over or alongside of a plate, having an edge capable of defining the regularly recurrent leading or trailing edge of width-modulated pulses to be generated by the beam sweeping over the aperture in said member, or over said plate, means for defining the trailing or leading edge, respectively, of the width-modulated pulses in accordance with the instants of occurrence of the time-modulated pulses, and a feedback circuit for controlling the direction of the beam in accordance with the number of electrons collected by the said member or plate, or by a collecting electrode associated with said apertured member for collecting electrons passing through the aperture, the arrangement being such that the feedback tends to increase the steepness of the leading and trailing edges of the width-modulated pulses.

The invention will be described by way of example with reference to the accompanying diagrammatic drawing in which.

Figures 1, 2, 3, 4:
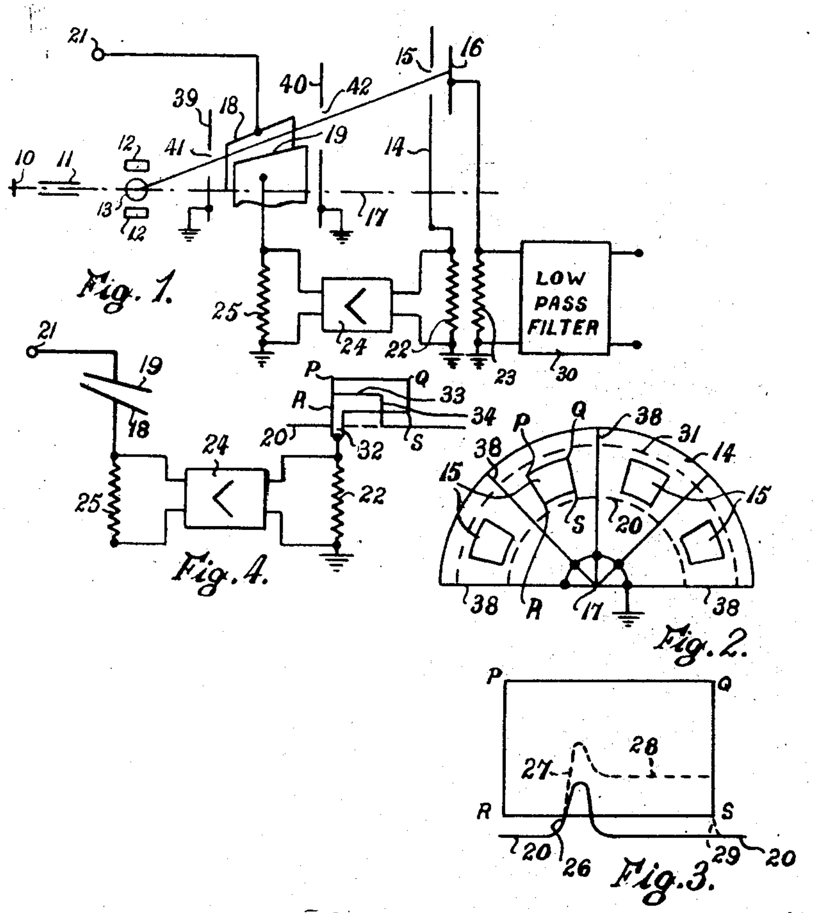
Figure 1 shows essential elements of one embodiment in side elevation.
Figure 2 is a view in end elevation of part of the apertured member in Fig. 1.
Figure 3 is an enlarged and developed view of one aperture of Figure 2 showing the path of the cathode ray beam over it.
Figure 4 illustrates a modification of the arrangement of Figure 1.

Referring to Figures 1 and 2, a cathode ray tube comprises a source of electrons 10, an arrangement of electrodes 11 for focussing the electrons into a narrow beam of approximately circular cross-section, deflecting means shown as deflecting coils 12 and 13 for causing the beam to sweep out a conical path, a plate 14 having therein apertures 15 located in the path of the beam and a collecting electrode 16 for collecting electrons which pass through the apertures. The apertured plate 14 is a disc having its centre on the axis 17 of the tube, that is to say, on the mean direction of the cathode ray beam, and each aperture is bounded by two radii PR and QS of this disc and two circular arcs PQ and RS. In the path of the beam on its way to the aperture are two deflecting electrodes 18 and 19, one on the outer side and the other on the inner side of the beam path. These are shown as frusto-conical. When no signal potentials are applied to these deflecting electrodes, it is arranged that the beam describes a circular path 20 upon the apertured member just within the inner boundary of the aperture, that is to say a path of radius slightly less than that of the inner boundary RS of the aperture. Time-modulated pulses to be converted into width-modulated pulses are applied to a terminal 21 and thus to the outer deflecting electrode 18 in a positive-going sense to increase the radius described by the rotating beam. The frequency and phase of the currents applied to the coils 12 and 13 to produce rotation of the cathode ray beam in the conical path are made such that whenever a pulse occurs the beam direction lies between the two radii PR and QS bounding an aperture. The effect of a positive signal pulse applied to the outer deflecting electrode is thus to cause the beam to enter the aperture and electrons then pass to the collecting electrode 16 instead of to the apertured member.

The apertured member 14 is connected to earth through a resistance 22 and the collecting electrode 16 is earthed through a resistance 23. A feedback circuit, including if desired an amplifier 24 is provided between the resistance 22 and a resistance 25 connected between the inner deflecting electrode 19 and earth. The effect of the feedback through this circuit is arranged to be such that when electrons cease to be collected by the apertured member 14, the potential applied to the inner deflecting electrode 19 is in a negative sense. The effect of the feedback is therefore to augment the effect produced by the positive pulse applied to the outer deflecting electrode 18 and urge the beam still further into the aperture in a radially outward direction. As soon as the pulse applied to the outer deflecting electrode 18 ceases, the deflection of the beam due to this outer electrode ceases, but it is arranged that the beam still remains within the aperture through the action of the feedback which continues because electrons are still reaching the collecting electrode 16, and not the apertured member 14. This condition persists until the beam reaches the trailing edge of the aperture when electrons are once more collected by the apertured member 14 and the negative potential fed back to the inner deflecting electrode 19 ceases.

This is clearly shown in Figure 3. The path that would be followed by the beam in the absence of feedback is shown in full lines at 20. When a pulse arrives on the outer electrode 18 the beam is deflected along the full line 26 until it crosses the boundary RS when the electrons reaching the plate 14 decrease. The feedback then causes the beam to follow the dotted path 27. When the pulse on electrode 18 ceases the beam begins to return towards its original path but, owing to the feedback, is prevented from moving beyond the path 28. It continues along the path 28 so long as the feedback lasts, that is until the beam crosses the edge QS, when it returns as shown at 29 to the original path 20.

The area PQRS of Figure 3 which has hitherto been spoken of as an aperture may equally well be regarded as one of a number of conducting plates taking the place of the apertures 15 of Figures 1 and 2. In this case the sense of the feedback must of course be reversed, either by providing one stage more or less in the amplifier 24 or by connecting the feedback to the electrode 18 instead of to the electrode 19.

The effect of the feedback is thus seen to be to increase the rate of increase of electrons passing to the collecting electrode 16 at the leading edge of the pulse and also to increase the rate at which the electrons collected by the collecting electrode 16 falls when the beam reaches the trailing edge QS of the aperture or plate. Moreover it will be seen that the electron current collected by the collecting electrode 16 is in the form of width-modulated pulses whose leading edges are determined by the instants of occurrence of the pulses applied to the outer deflecting electrode 18 and whose trailing edges are determined by the trailing edges QS of the apertures or plates and consequently occurs regularly. The effect of the feedback is to steepen both the leading and the trailing edges of this width-modulated pulse.

The output may be taken from across the resistor 22 in series with the electrode 14, in which case the pulses will be in positive sense, or as shown from across the resistance 23 in which case the pulses will be in negative sense, and this output may then be applied to a low-pass filter 30 by which the modulation is extracted. Instead of feedback being taken from the apertured member 14, it may be taken from the collecting electrode 16, the phase of the feedback circuit being suitably modified.

The arrangement above described is suitable for use with a single-channel, a single collecting electrode 16 being provided to co-operate with all the apertures. Alternatively, for a single channel, only one aperture 15 need be provided. When the arrangement is used in a multi-channel system a separate collecting electrode 16 is provided to co-operate with each aperture 15. The particular arrangement shown in Figure 2 with eight apertures is suitable for use in a 16 channel system, the arrangement shown handling say the odd-numbered channels and a second, like arrangement being provided for the even-numbered channels. The speed of rotation of the cathode ray beam is arranged to suit the recurrence frequency of the pulses employed in such a manner that the beam executes one complete rotation over the apertured member in the pulse recurrence period of a channel. The outputs of width-modulated pulses for the several channels are taken at the several collecting electrodes 16 to separate low-pass filters 30 from the outputs of which are obtained the modulations of the respective channels. In this form, therefore, the apparatus according to the invention serves both for converting pulses from time to width-modulation and also for separating pulses of one channel from those of other channels.

Many variations in the circuit described are possible, and some of these will be mentioned by way of example. It may be arranged that the path of the beam over the apertured member 14 lies, as shown at 31 in Figure 2, outside the aperture or apertures (that is to say is at a greater radius than these apertures) when no signal voltages are applied to the deflecting electrodes 18, 19, the sense of the signal voltages applied to these electrodes then being suitably chosen to cause the beam to be deflected radially inwards by the signal potential and by the feedback potential. The functions of the two deflecting electrodes may be reversed, the signal being applied to the inner and the feedback to the outer electrode.

If desired there may be provided radial screens between adjacent channel apertures, as shown at 38 in Figure 2 and screening plates 39 and 40 as shown in Figure 1, in the form of masks containing suitable apertures 41, 42 for the passage of the beam.

When the apertures 15 in Figures 1 and 2 are replaced by plates, one of the deflecting electrodes, say 19, may be made in the form of a number of mutually insulated electrodes, each plate being coupled by a separate feedback circuit 22, 24, 25 to one of the electrodes 19. This avoids undesired coupling between channels. Alternatively, a common feedback circuit and deflecting electrode may be used if separating devices such as separating valves are provided between each of the plates and the feedback circuit or if the impedance common to the several channels is made sufficiently low, for instance by using a cathode-follower valve circuit. In this case negative width-modulated pulses are derived from each plate.

In the arrangements so far described, the regularly recurrent edge of the width-modulated pulses has been the trailing edge, this trailing edge being determined by the trailing edge QS of the aperture or corresponding plate. If desired, however, the leading edge of the width-modulated pulse may be determined by the aperture or corresponding plate and the trailing edge may be varied in time in accordance with time-modulated pulses. In the case where the beam normally describes a path at a smaller radius than the aperture, as shown in Figure 4 the aperture PQRS is provided at its leading edge RS with a narrow slot 32 extending radially inwards into the normal path 20 of the beam. When the beam in its rotation strikes this slot, the number of electrons collected by the apertured member 14 falls, whilst the number collected by the collecting electrode 16 rises. Under these conditions the feedback is arranged to deflect the ray radially outwards into the main aperture. The ray continues to traverse this main aperture along the path 33 until a time-modulated pulse occurs, when it is arranged to be deflected inwardly along the path 34 across the inner circular boundary of the aperture, this inward deflection being assisted by the feedback, and the trailing edge of the pulse is thus defined by the time-modulated pulse. Immediately the beam leaves the aperture, the feedback is arranged to cease, or at least to assume a value insufficient to maintain the beam at as large a radius as the inner boundary of the aperture. This arrangement therefore functions in a manner entirely analogous to that previously described in which the leading edge of the pulse is time-modulated and the trailing edge occurs at a uniform rate.

In Figure 4 is shown the case in which the pulses are applied to the inner deflecting electrode 19 and the feedback to the outer deflecting electrode 18. The sense of this feedback and the sense of the pulses applied at terminal 21 are chosen as has already been described.

If the cathode ray beam is arranged normally to traverse a path at a radius greater than the aperture, the narrow slot is arranged to extend radially outwards and the time-modulated pulses and feedback are arranged to deflect the beam radially inwards. Moreover it is evident that the aperture PQRS can be regarded as a plate, the part 32 being then a narrow conducting strip. By the use of a number of such plates, the arrangement can be adapted for multi-channel operation.

It is not necessary, although it is usually more convenient, that the cathode ray beam should traverse a circular path. If desired, for instance, the apertures or corresponding plates may be arranged in a straight line and the beam may be arranged to sweep along a straight line path over them; the scan in this case may consist of a relatively slow forward stroke over the apertures or plates, or alongside of them, and a rapid return stroke during which the beam is returned to its starting point.

In the apparatus so far described, the modulated leading or trailing edge of the width-modulated pulses has been determined by giving to the ray a radial or lateral component of deflection.

For various reasons it may be found undesirable that the voltage at the electrodes 14 or 16 should itself be fed back, with or without amplification. For instance, background noise may be thereby increased. A procedure such as is illustrated in Figure 6 may then be adopted. Broadly what is done is to use the voltages, generated either in the plate 14 or in the electrode 16 when the beam crosses the edges PR and QS in the case of arrangements as in Figure 5 or the edges RS and QS in Figures 1 to 3, to trigger on and off respectively a generator of a suitable feedback voltage.

Figure 5:
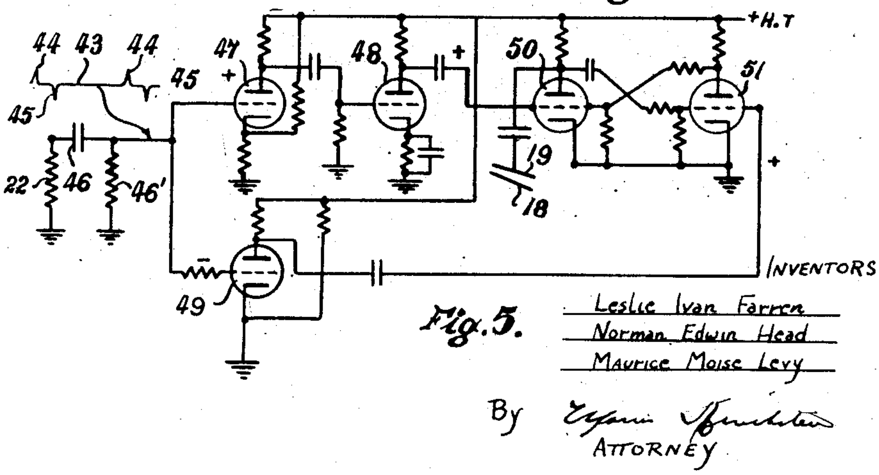
Figure 5 is a circuit diagram of part of a modification of Figure 1.

In Figure 5 there is shown at 43 the wave form produced by differentiating the voltage on plate 14 or 16 due to the crossings of the edges, that is to say by applying this voltage, say that across resistance 22, to a circuit 46, 46', of suitably short time-constant. Each crossing of a leading edge gives rise to, say, a positive pulse 44 and each crossing of a trailing edge gives rise to a negative pulse 45. The positive pulses are selected by a circuit including valves 47 and 48 and the negative pulses by a circuit including a valve 49. The valve 47 has its cathode positively biased to anode current cut-off and so rejects negative-going pulses 45 and accepts positive-going pulses 44. The valve 48 acts as a phase-inverter so that each pulse 44 produces a positive pulse at the anode of 48. The valve 49 has its cathode and grid at the same potential and rejects positive-going pulses owing to grid current. Negative-going pulses 45 give rise to positive-going pulses at its anode.

The generator of feedback voltage is in this example a multi-vibrator comprising two valves 50 and 51 arranged as what is known as a "flip-flop," which has one stable condition in which the valve 50 is insulating and the valve 51 conducting. When a positive pulse 44 occurs at the input of the circuit of Figure 5 and hence a positive pulse is applied to the grid of valve 50, this valve conducts and 51 insulates. When the next negative pulse occurs at the input a positive pulse is applied to the grid of valves 51 and the circuit is restored to its original condition. Preferably the circuit is arranged to return to its original condition automatically after a suitable lapse of time should a negative pulse for any reason fail to make itself effective. During the interval between one pair of pulses 44, 45, corresponding to the time whilst the beam is crossing an aperture, a negative voltage is developed at the anode of valve 50 and applied to the deflecting plate 19. The voltage applied to plate 19 whilst controlled by the voltage developed by the beam sweeping over the aperture in the plate 14 is free from any noise voltage that may exist at 14.

It is not essential that the broadening of the pulses should be produced simultaneously with the conversion of the time-modulated pulses to width-modulated pulses. If desired, the time-modulated pulses may first be broadened, for example in one of the ways described in the specification of Patent Application Serial No. 11,368 and these broadened pulses may be applied to deflect, or to control the intensity of, the cathode ray beam. The effect of the feedback is then to steepen the leading and trailing edges of the broadened pulses.

We claim:

1. Apparatus for demodulating time-modulated pulses comprising a cathode ray tube, an apertured electron-intercepting member, a collecting electrode for collecting electrons passing through the aperture in said member, means for deflecting the cathode ray beam recurrently along a path alongside of said aperture, further means to deflect the cathode ray beam in a direction transverse with respect to said path, means to apply said time-modulated pulses to said further means to cause said cathode ray beam to traverse an edge of said aperture and a feedback circuit comprising means to derive a voltage in response to each traversal of said edge by said beam and means to apply said voltage to deflect said beam in a sense assisting said time-modulated pulses.

2. Apparatus according to claim 1, wherein the voltage-deriving means of the feed-back circuit comprises an impedance connected to be traversed by electron current from one of said electrodes.

3. Apparatus according to claim 1 wherein the intercepting electrode has a slot connected with the aperture and positioned to lie in said path.

4. Apparatus according to claim 1, wherein said means to derive a voltage comprise a pulse generator for generating said voltage in the form of pulses, means for deriving controlling pulses from traversals of said edge and means for applying said controlling pulses to said generator to control the generation of pulses thereby.

5. Apparatus for demodulating time-modulated pulses comprising a cathode ray tube, an electron-intercepting member, means for deflecting the cathode ray beam recurrently along a path alongside of said member, further means to deflect the cathode ray beam in a direction transverse with respect to said path, means to apply said time-modulated pulses to said further means to cause said cathode ray beam to traverse an edge of said member and a feedback circuit comprising means to derive a voltage in response to each traversal of said edge by said beam and means to apply said voltage to deflect said beam in a sense assisting said time-modulated pulses.

6. Apparatus according to claim 5, wherein said means to derive a voltage comprise a pulse generator for generating said voltage in the form of pulses, means for deriving controlling pulses from traversals of said edge and means for applying said controlling pulses to said generator to control the generation of pulses thereby.

7. Apparatus for demodulating time-modulated pulses comprising a cathode ray tube, a conducting target member, a collecting member to collect electrons passing around said target member, means for deflecting the cathode ray beam recurrently along a path alongside of said target member, further means to deflect the cathode ray beam in a direction transverse with respect to said path, means to apply time-modulated pulses to said further means to cause said cathode ray beam to traverse on edge of said target member, an impedance connected to be traversed by electron current from one of said members to generate a voltage in said impedance, and means to apply said voltage to deflect said beam in a sense to assist said time-modulated pulses.

8. Apparatus for demodulating time-modulated pulses comprising a cathode ray tube, an electron intercepting electrode, said electrode having an edge, a collecting electrode positioned to collect electrons of the cathode ray beam passing said intercepting electrode, means to deflect said cathode ray beam recurrently along a path close to said edge, a circuit for applying time-modulated pulses to deflect the beam transversely with respect to said path to cross said edge, and a feedback circuit comprising means to derive a voltage from one of said electrodes in response to each traversal of said edge by said beam and means to apply said voltage to deflect said beam in a sense assisting said time-modulated pulses.

LESLIE IVAN FARREN.
NORMAN EDWIN HEAD.
MAURICE MOÏSE LEVY.

References Cited in the file of this patent

UNITED STATES PATENTS

| Number | Name | Date |
|---|---|---|
| 2,265,848 | Lewis | Dec. 9, 1941 |
| 2,463,535 | Hecht | Mar. 8, 1949 |
| 2,474,812 | Arditi et al. | July 5, 1949 |
| 2,578,527 | Farren | Dec. 11, 1951 |